US 6,724,971 B2

(12) United States Patent
Chang

(10) Patent No.: US 6,724,971 B2
(45) Date of Patent: Apr. 20, 2004

(54) VARIABLE OPTICAL ATTENUATOR

(75) Inventor: Chih Chiang Chang, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 99 days.

(21) Appl. No.: 10/092,202

(22) Filed: Mar. 4, 2002

(65) Prior Publication Data

US 2003/0103757 A1 Jun. 5, 2003

(30) Foreign Application Priority Data

Nov. 30, 2001 (TW) .................................. 90220803 U

(51) Int. Cl.[7] ................................................ G02B 6/00
(52) U.S. Cl. ...................... 385/140; 385/15; 359/227
(58) Field of Search .............................. 385/15, 27, 39, 385/140; 359/227

(56) References Cited

U.S. PATENT DOCUMENTS

2003/0049011 A1 * 3/2003 Chang ...................... 385/140

* cited by examiner

Primary Examiner—Frank G. Font
Assistant Examiner—Michael P. Mooney
(74) Attorney, Agent, or Firm—Wei Te Chung

(57) ABSTRACT

A variable optical attenuator includes a base (12), an attenuating means (11), a first collimator (13) retaining an input fiber (18), a second collimator (14) retaining an output fiber (20) and an optical baffle (116). The attenuating means has four anamorphic prisms (111,112,113,114). The optical baffle is driven to move into light path of the first collimator and is expanded by two anamorphic prisms to block a part of the light beam. Thereafter, the retaining part of the light path passes through other two anamorphic prisms and shrinks to form a parallel light beam received by the second collimator.

15 Claims, 3 Drawing Sheets

VARIABLE OPTICAL ATTENUATOR

BACKGROUND OF THE INVENTION

1. Field of the Invention

The present invention relates to a variable optical attenuator for use in optical fiber communications and for use with optical network technology, and particularly to a variable optical attenuator with anamorphic prisms to realize a variable attenuation of optical power.

2. Description of Related Art

An optical attenuator is a passive optical component for reducing optical power propagating in an optical fiber, and may perform fixed or variable attenuation. Optical attenuators are widely used in optical transmission systems and optical networks.

Means for providing fixed attenuation are well known in the art, which generally utilize a medium of fixed optical density disposed between a signal input fiber and a signal output fiber. These media can comprise isolated material placed between the signal carrying fibers or can comprise a coating upon the terminal end of at least one of the signal carrying fibers.

In the past, variable attenuations have reduced signal levels by transmitting such signals through partially opaque optical filters, by obstructing a section of the signal with attenuation filter segments, by varying the orientation between signal input and output fibers, or by diminishing signal strength via reflecting from partially light absorbent elements.

For example, U.S. Pat. No. 4,591,231 describes an optical attenuator containing a disk having a plurality of openings with fixed, neutral density filters of differing optical density contained therein. By rotating the disk, a fixed density filter of a desired opacity can be introduced into the signal path, thereby attenuating a portion of the signal. Although effective for reducing signal strength, such a system is limited in that attenuation levels vary in a step-wise rather than a continuous manner.

As shown in FIG. 4, U.S. Pat. No. 4,989,938 discloses another variable attenuator 100, which comprises a housing 150 containing a first optical fiber connector 140, a first optical lens 160, a first connecting optical fiber 180, a second optical lens 200 separated from the first optical lens 160 by an optical coupling region, a second optical fiber connector 220, a second connecting optical fiber 240, an optical filter 260 and a reciprocating means 280. The optical filter 260 is a flexible film having an optical density gradient varying along its length, which is mounted in an orientation substantially orthogonal to the optical axis within the optical coupling space between each of lenses 160 and 200. The filter 260 is operably connected to the reciprocating means 280 to vary the vertical position of the filter 260. As the density of the filter 260 is a gradient along its length, such vertical movement serves to provide areas or regions of differing optical density that transmits and absorbs differing amounts of light, thereby providing a continuously variable filter means between the lenses 160 and 200. In this application, the design and the manufacture of the filter are difficult and complex, so as to make the cost of the attenuator high.

It is thus desirable to provide a variable optical attenuator for overcoming the above problems.

SUMMARY OF THE INVENTION

An object of present invention is to provide a variable optical attenuator having anamorphic prisms for expanding a light beam, and an optical baffle for blocking the light beam.

Another object of the present invention is to provide a simple and low-cost variable attenuator that operates easily.

To achieve the above objects, in accordance with the present invention, a variable optical attenuator comprises a base, an attenuating means, a first collimator retaining an input fiber and a second collimator retaining an output fiber.

The attenuating means comprises a first anamorphic prism, a second anamorphic prism, a third anamorphic prism, a forth anamorphic prism a carrier and an optical baffle. Each anamorphic prism has two unparallel opposite surfaces. The optical baffle is mounted in a slot defined in the carrier.

In assembly, the four anamorphic prisms are orderly arranged on the base between two collimators respectively held in two through holes defined in two opposite walls of the base. The first and second anamorphic prisms are symmetrically arranged to the forth and third anamorphic prisms. The optical baffle is driven to move into light beam which comes from the first collimator and is expanded by the first and second anamorphic prisms, then blocks one part of the light beam. Thereafter, another part of the light beam passes through the third and forth anamorphic prisms and shrinks to form a parallel light beam received by the second collimator. Thereby, one part of light is lost.

Other objects, advantages, and novel features of the present invention will become more apparent from the following detailed description when taken in conjunction with the accompanying drawings.

DETAILED DESCRIPTION OF THE INVENTION

Figure 1:
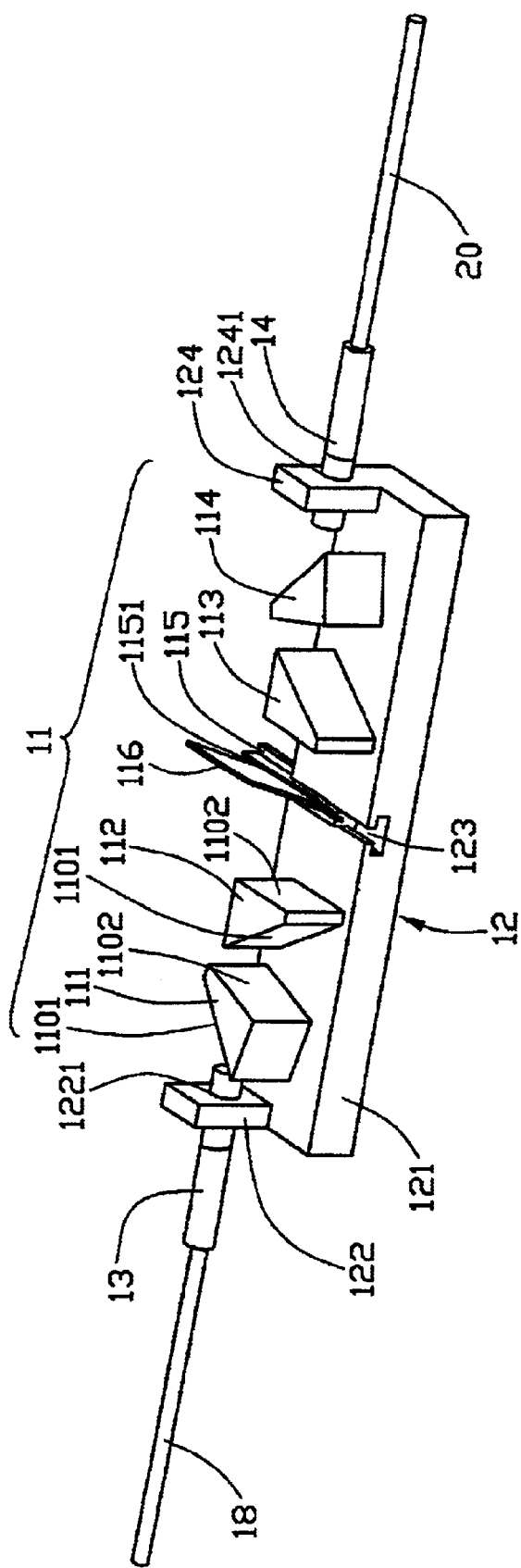
FIG. 1 is an assembled view of a variable optical attenuator in accordance with the present invention.
Figure 2:
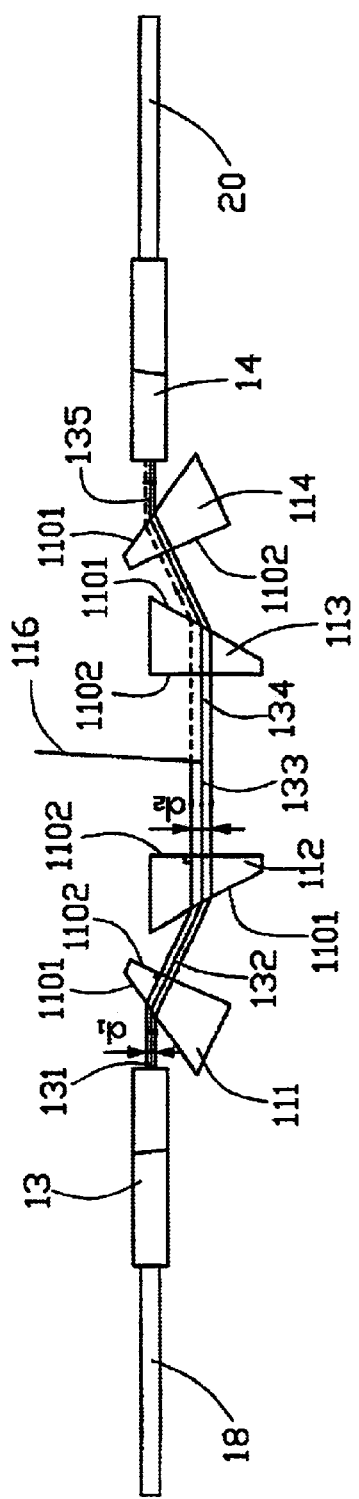
FIG. 2 shows an optical path of the variable optical attenuator.

As shown in FIGS. 1 and 2, a variable optical attenuator according to the present invention comprises a base 12, an attenuating means 11, a first collimator 13 retaining an input fiber 18 and a second collimator 14 retaining an output fiber 20.

The attenuating means 11 comprises a first anamorphic prisms 111, a second anamorphic prisms 112, a third anamorphic prisms 113, a forth anamorphic prisms 114, a carrier 115 and an optical baffle 116. Each of the four anamorphic prisms 111, 112, 113, 114 has two unparallel opposite surfaces 1101, 1102. The optical baffle 116 is mounted in a slot 1151 which is defined in the carrier 115. Both the baffle 116 and the carrier 115 are arranged between the second anamorphic prism 112 and the third anamorphic prism 113.

The base 12 comprises two opposite walls 122, 124 and a main body 121. A T-shaped groove 123 is defined in the main body 121, in which the carrier 114 can be received and slide. Two opposite walls 122, 124 extend upward from two ends of the main body 121 and are substantially perpendicular to the main body 121. Two opposite walls 122, 124 define two opposite through holes 1221, 1241 for respectively holding the collimators 13, 14 therein.

In assembly, the four anamorphic prisms 111, 112, 113, 114 are orderly arranged on the main body 121 of the base 12 between the two collimators 13, 14 respectively held in the two through holes 1221. The anamorphic prisms 112, 111 and the anamorphic prisms 113, 114 are arranged at both sides of the groove 123 of the base 12. The first anamorphic prism 111 and the second anamorphic prisms 112 are assembled on the base 12, wherein the surface 1101 of the second anamorphic prism 112 is adjacent to the surface 1102 of the second anamorphic prism 112. The anamorphic prisms 113, 114 are symmetrically arranged to the anamorphic prisms 112, 111. The optical baffle 116 is fixed in the slot 1151 of the carrier 115 which can be driven to move along the groove 123 of the base 12.

Figure 3:
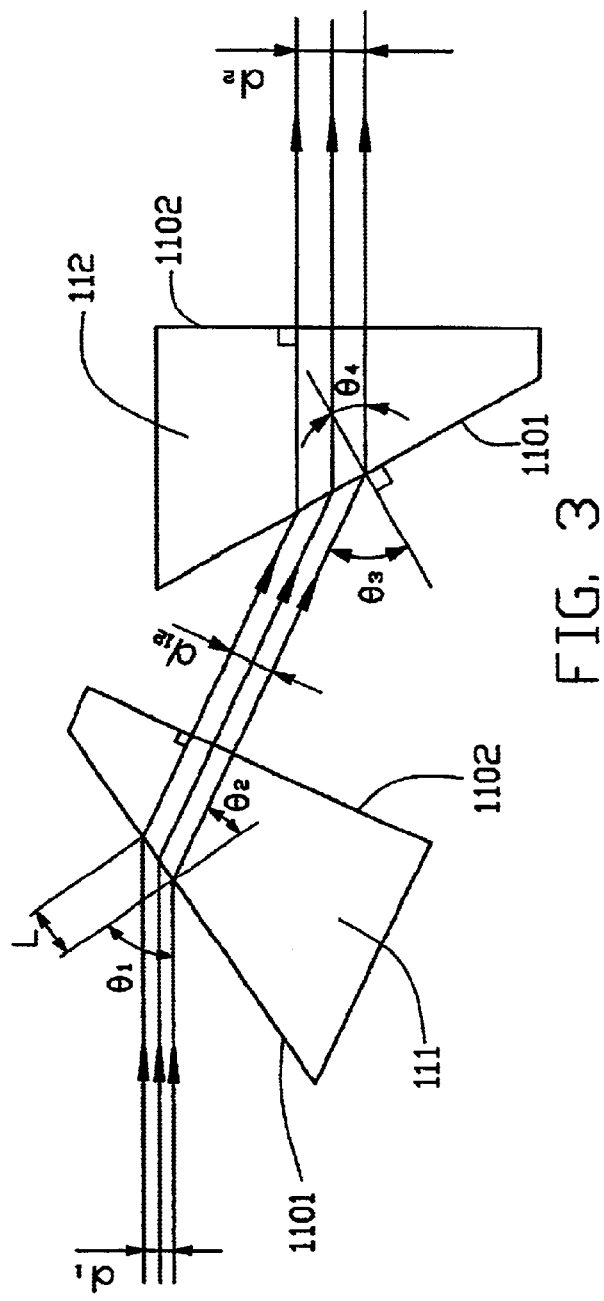
FIG. 3 shows a part of the optical path in FIG. 2.
Figure 4:
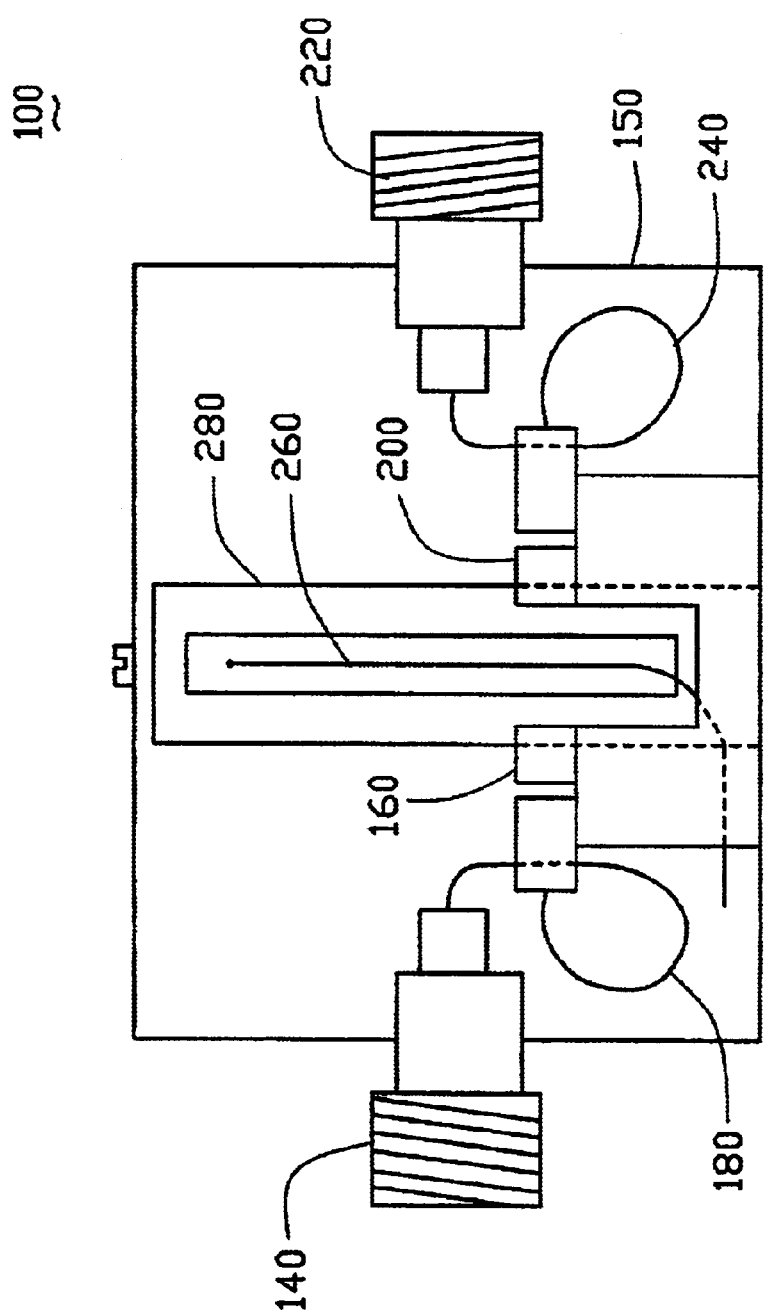
FIG. 4 is a view of a conventional optical attenuator.

Referring to FIGS. 2 and 3, a parallel light beam 131 with a width ($d_1$) from the first collimator 13 enters the anamorphic prism 111 from the surface 1101 of the first anamorphic prism 111 at an angle of incidence ($\theta_1$), then a first expanding light beam 132 with a width ($d_{12}$) perpendicularly passes through the surface 1102 of the first anamorphic prism 111, satisfying the following relationship:

$$L \times \cos\theta_1 = d_1; L \times \cos\theta_2 = d_{12}; \theta_2 < \theta_1 < 90°$$

($\theta_2$: angle of refraction)
According to Snell's law, the widths ($d_{12}, d_1$) are related to the angle ($\theta_1$) by $$d_{12}/d_1 = \cos\theta_2/\cos\theta_1 = \cos[\sin^{-1}(n_0 \sin\theta_1/n_1)]/\cos\theta_1 > 1 \quad (1)$$

where $n_0$ is refractive index of air, $n_1$ is refractive index of anamorphic prism. Then the first expanding light beam 132 enters the second anamorphic prism 112 with angle of incidence ($\theta_3$), and a second expanding light beam 133 perpendicularly passes through the surface 1102 of the second anamorphic prism 112 and has a width ($d_2$), wherein:

$\theta_3 = \theta_1$; $\theta_4 = \theta_2$; ($\theta_4$: angle of refraction)
According to Snell's law, the widths ($d_2, d_{12}$) are related to the angle ($\theta_1$) by $$d_2/d_{12} = \cos[\sin^{-1}(n_0 \sin\theta_1/n_1)]/\cos\theta_1 > 1 \quad (2)$$

where $n_0$ is refractive index of air, $n_1$ is refractive index of anamorphic prism. From relationships (1) and (2), the widths ($d_2, d_1$) are related to the angle ($\theta_1$) by $$d_2/d_1 = \cos^2[\sin^{-1}(n_0 \sin\theta_1/n_1)]/\cos^2\theta_1 \quad (3)$$

where $n_0$ is refractive index of air, $n_1$ is refractive index of anamorphic prism.

When the parallel light beam 131 passes through the anamorphic prisms 111, 112, the expanding parallel light beam 133 is formed, and formula (3) is an expanding ratio. The optical baffle 116 fixed in the carrier 115 is driven to move into the light beam and blocks a portion of the light beam 133. Thereafter, the rest of the light beam 134 passes through the anamorphic prisms 113, 114, and forms a parallel light beam 135 received by the second collimator 14.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A variable optical attenuator comprising:
   a first collimator retaining an input fiber;
   a second collimator retaining an output fiber; and
   an attenuating means having two anamorphic prisms for respectively expanding and shrinking parallel light beam and an optical baffle positioned between the two anamorphic prisms;
   wherein, the parallel light beam from the first collimator passes through one anamorphic prism, then expands to form an expanding light beam, the optical baffle is moveable to block part of the expanding light beam, and another part of the expanding light beam is shrunk by the other anamorphic prism, then is received by the second collimator and outputs from the output fiber.

2. The variable optical attenuator as claimed in claim 1, further comprising a base defining a groove and a carrier received in the groove for fixing the baffle thereon, and the two anamorphic prisms symmetrically assembled on the base about the groove.

3. The variable optical attenuator as claimed in claim 2, wherein the base further comprises two opposite walls extending upwardly from two opposite ends of the base, and the two walls define two opposite through holes for mounting the first and second collimators therein.

4. The variable optical attenuator as claimed in claim 1, wherein the anamorphic prism has two unparallel opposite surfaces, the light beam passes through the two surfaces and is perpendicular to one of the two surfaces.

5. A variable optical attenuator comprising:
   a first collimator;
   a second collimator;
   a first anamorphic prism, a second anamorphic prism, a third anamorphic prism and a forth anamorphic prism orderly positioning in parallel light beam from first collimator; and
   an optical baffle for blocking part of the light beam;
   where in parallel light beams coming from the first collimator pass through the first and the second anamorphic prisms, then expand to form an expanded light beams, the optical baffle is moveable to block a part of the expanded light beams, the remaining part of the expanded light beams are shrunk by the third and forth anamorphic prisms, then are received by the second collimator.

6. The variable optical attenuator as claimed in claim 5, wherein the first collimator retains an input fiber for inputting light beams, the second collimator retains an output fiber for outputting the light beams.

7. The variable optical attenuator as claimed in claim 5, further comprising a base defining a groove and a carrier received in the groove for fixing the baffle thereon, wherein the forth and the third anamorphic prisms are symmetrically arranged with respect to the first and the second anamorphic prisms, and four anamorphic prisms are assembled on the base.

8. The variable optical attenuator as claimed in claim 7, wherein the base further comprises two opposite walls extending upwardly from two opposite ends of the base, the two walls defining two opposite through holes for mounting the first and second collimators therein.

9. The variable optical attenuator as claimed in claim 5, wherein each anamorphic prism has two unparallel opposite surfaces, and the light beam passes through the two surfaces and is perpendicular to one of the two surfaces.

10. A variable optical attenuator comprising:

a first collimator retaining an input fiber;

a second collimator retaining an output fiber; and an attenuating means having an expanding device for expanding parallel light beam from the first collimator and an optical baffle for blocking part of the light beam;

wherein, parallel light beam from the first collimator passes through the expanding device, then expands to form an expanding light beam, the optical baffle is adjustably moveable to block part of the expanded light beam, and thus another part of the expanded light beam is adapted to be received by the second collimator and outputs from the output fiber.

11. The variable optical attenuator as claimed in claim 10, wherein said expanding device includes at least one anamorphic prism for expanding light beam.

12. The variable optical attenuator as claimed in claim 11, wherein said expanding device includes another anamorphic prism for shrinking the expanded light beam, which is symmetrically arranged to the at least one anamorphic prism for expanding the parallel light beam.

13. The variable optical attenuator as claimed in claim 11, wherein the at least one anamorphic prism has two unparallel opposite surfaces, the light beam passes through the two surfaces and is perpendicular to one of the two surfaces.

14. The variable optical attenuator as claimed in claim 10, further comprising a base defining a groove and a carrier received in the groove for fixing the baffle thereon.

15. The variable optical attenuator as claimed in claim 14, wherein the base further comprises two opposite walls extending upwardly from two opposite ends of the base, and the two walls define two opposite through holes for mounting the first and second collimators therein.

* * * * *